United States Patent
Cooley

(10) Patent No.: US 8,751,490 B1
(45) Date of Patent: Jun. 10, 2014

(54) AUTOMATICALLY DETERMINING REPUTATIONS OF PHYSICAL LOCATIONS

(75) Inventor: Shaun P. Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 347 days.

(21) Appl. No.: 13/077,542

(22) Filed: Mar. 31, 2011

(51) Int. Cl.
*G06F 7/00* (2006.01)
*G06F 17/30* (2006.01)

(52) U.S. Cl.
USPC .............................. 707/724; 707/725; 707/748

(58) Field of Classification Search
USPC ......... 707/748–751, 918–921, 724; 705/7.34; 704/E15.026
See application file for complete search history.

(56) References Cited

U.S. PATENT DOCUMENTS

2004/0093268 A1* 5/2004 Ramchandani et al. ........ 705/14
2005/0091209 A1* 4/2005 Frank et al. ........................ 707/3
2009/0007102 A1* 1/2009 Dadhia et al. ..................... 718/1

* cited by examiner

*Primary Examiner* — Sherief Badawi
*Assistant Examiner* — Berhanu Mitiku
(74) *Attorney, Agent, or Firm* — Brill Law Office; Jeffrey Brill

(57) ABSTRACT

A physical location rating management system automatically calculates reputation scores for physical locations. A plurality of types of data concerning a plurality of physical locations are collected from a plurality of sources. It is determined to which specific physical location specific collected data pertains. Specific score adjustment factors quantifying adjustments to make to reputation scores are determined for multiple, specific physical locations, based on specific collected data. Score adjustment factors can be determined by, for example, performing keyword scoring and/or automated document classification of specific collected data. The determined score adjustment factors for each of the multiple, specific physical locations are aggregated, in real time, as the score adjustment factors are determined. Specific reputation scores for specific physical locations are calculated, based on the aggregated score adjustment factors for the specific physical locations.

20 Claims, 4 Drawing Sheets

US 8,751,490 B1

AUTOMATICALLY DETERMINING REPUTATIONS OF PHYSICAL LOCATIONS

TECHNICAL FIELD

This disclosure pertains generally to computer utilities for physical location security assessment, and more specifically to automatically calculating reputation scores for physical locations.

BACKGROUND

Prior to travelling to a new location, it is typical for a traveler to perform some research concerning the destination in advance. This research might target things such as local restaurants, lodging, and available activities. Frequently, the traveler does at least some research on how safe the area is. Depending on the distance from the traveler's home, different techniques might be utilized to acquire knowledge of the safety conditions at the destination. For a trip to a distant location, the traveler might read online or print travel guides, such as TripAdvisor, Frommer's, Rough Guides, etc. The traveler might also perform a cursory search of news sites or State Department advisories. For a trip to a location that is closer to home, the traveler might rely on so-called conventional wisdom or previously held assumptions (e.g., East Los Angeles is dangerous, the Upper East Side of Manhattan is safe). These techniques can be useful, but the resulting information is likely to be out of date and/or incomplete, which means that the traveler might be under prepared or unnecessarily over prepared for the actual conditions that exists at the destination.

It would be desirable to address these issues.

SUMMARY

A physical location rating management system automatically calculates reputation scores for physical locations. A plurality of types of data concerning a plurality of physical locations are collected from a plurality of sources. It is determined to which specific physical location specific collected data pertains. This can comprise parsing the text of the specific collected data, and identifying the corresponding specific physical location. In some embodiments, the specific physical location is inferred from a reference in the specific collected data. Specific score adjustment factors quantifying adjustments to make to reputation scores are determined for multiple, specific physical locations, based on specific collected data. Score adjustment factors can be determined by, for example, performing keyword scoring and/or automated document classification of specific collected data. In some embodiments, specific determined score adjustment factors are weighed, based on the originating sources of corresponding collected data. The determined score adjustment factors for each of the multiple, specific physical locations are aggregated, in real time, as the score adjustment factors are determined. The aggregated, determined score adjustment factors for each of the multiple, specific physical locations can be stored, for example in a geospatial storage mechanism. In some embodiments, the collected data corresponding to determined score adjustment factors and physical locations is also logged, for future reference. Specific reputation scores for specific physical locations are calculated, based on the aggregated score adjustment factors for the specific physical locations. A calculated reputation score comprises a single, quantified value measuring at least one category concerning a specific physical location, based on the collected data from the plurality of sources.

In some embodiments, specific lengths of time are determined for which at least some specific determined score adjustment factors are to affect the calculation of reputation scores for specific physical locations. In such embodiments, determined score adjustment factors are aggregated and specific reputation scores are calculated, during the determined lengths of time. In some embodiments, specific indications of temporal applicability for at least some specific score adjustment factors are determined. In these embodiments, the specific indications of temporal applicability for the corresponding score adjustment factors are aggregated. Specific reputation scores for specific physical locations are calculated, based on the aggregated score adjustment factors filtered according to the aggregated specific indications of temporal applicability.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
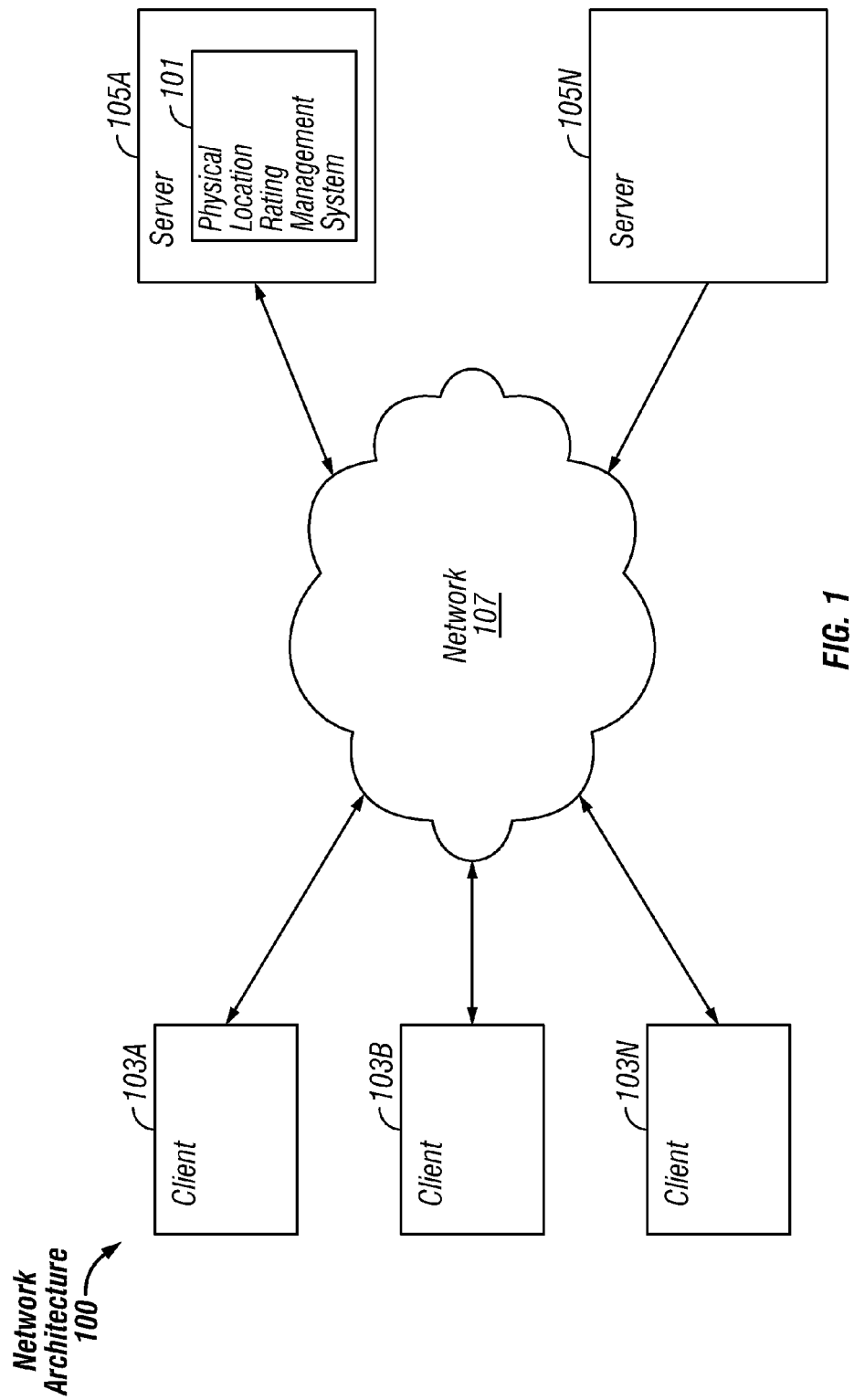
FIG. 1 is a block diagram of an exemplary network architecture in which a physical location rating management system can be implemented, according to some embodiments.

FIG. 1 is a block diagram illustrating an exemplary network architecture 100 in which a physical location rating management system 101 can be implemented. The illustrated network architecture 100 comprises multiple clients 103A, 103B and 103N, as well as multiple servers 105A and 105N. In FIG. 1, the physical location rating management system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
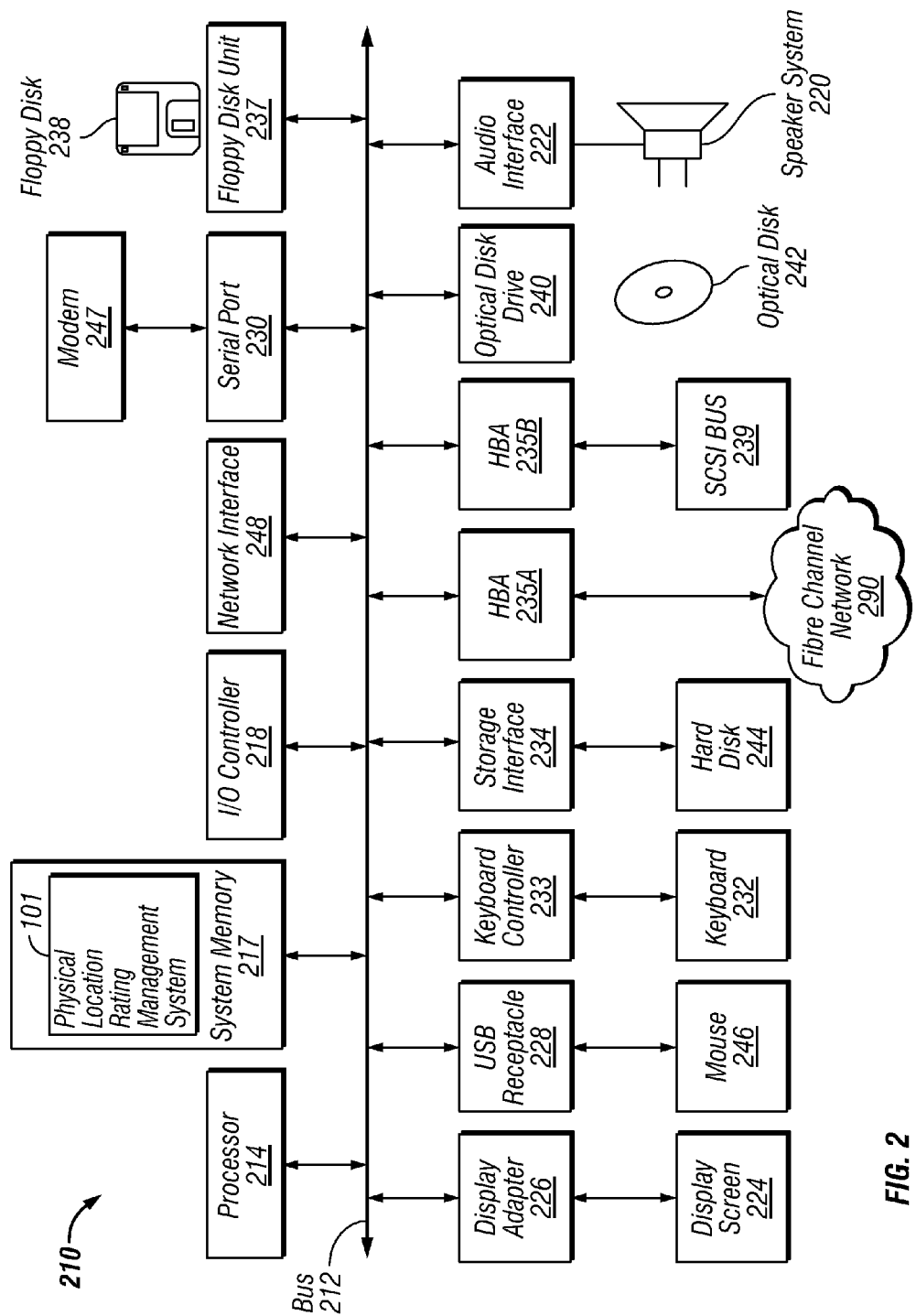
FIG. 2 is a block diagram of a computer system suitable for implementing a physical location rating management system, according to some embodiments.

FIG. 2 is a block diagram of a computer system 210 suitable for implementing a physical location rating management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the physical location rating management system 101 is illustrated as residing in system memory 217. The workings of the physical location rating management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
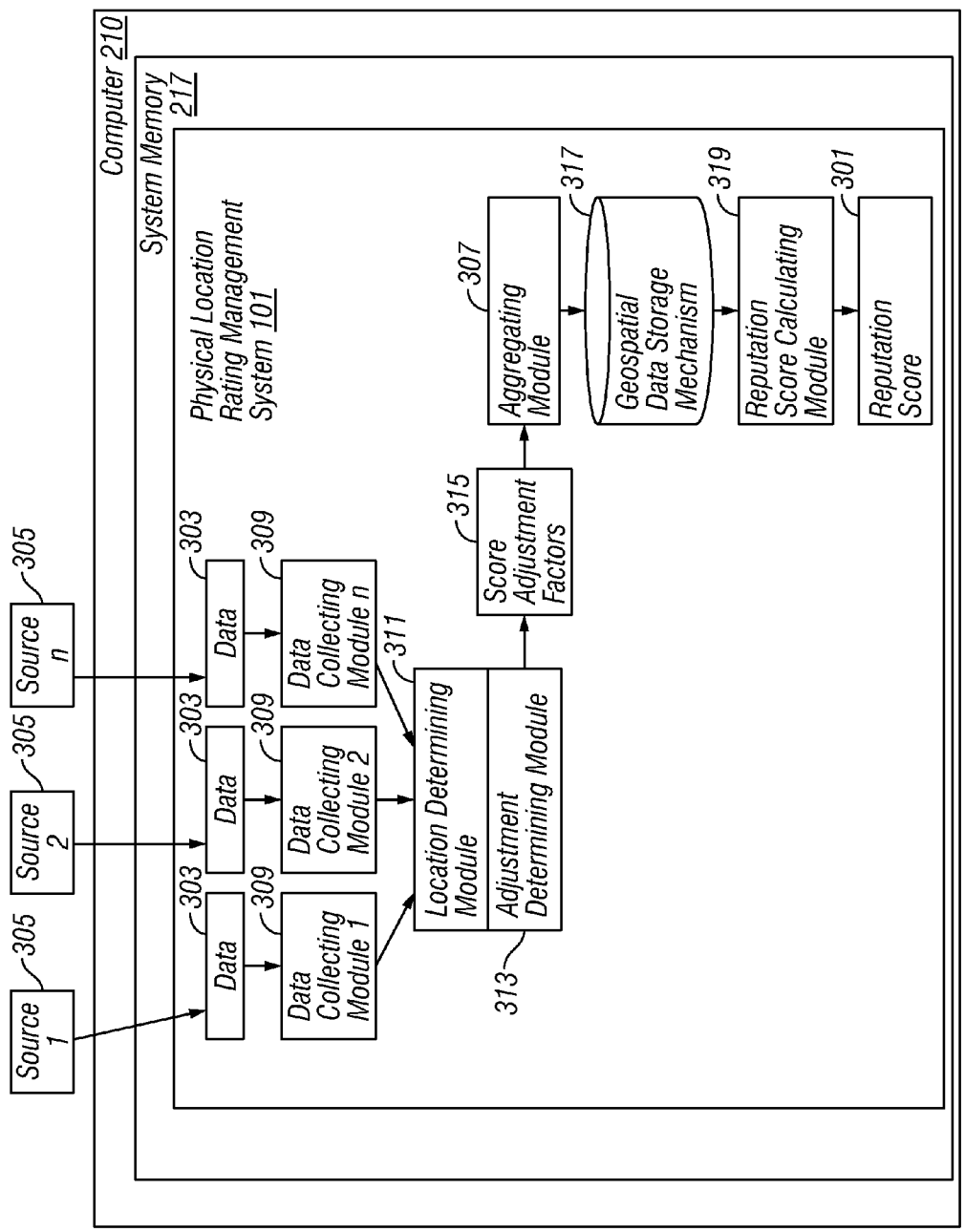
FIG. 3 is a block diagram of the operation of a physical location rating management system, according to some embodiments.

FIG. 3 illustrates the operation of a physical location rating management system 101 residing in the system memory 217 of a computer system 210, according to some embodiments. As described above, the functionalities of the physical location rating management system 101 can reside on a client 103, a server 105, or be distributed between multiple computer systems 210, including within a cloud-based computing environment in which the functionality of the physical location rating management system 101 is provided as a service over a network 107. It is to be understood that although the physical location rating management system 101 is illustrated in FIG. 3 as a single entity, the illustrated physical location rating management system 101 represents a collection of functionalities, which can be instantiated as a single or multiple modules as desired (an instantiation of specific, multiple modules of the physical location rating management system 101 is illustrated in FIG. 3). It is to be understood that the modules of the physical location rating management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the physical location rating management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the physical location rating management system 101 automatically calculates reputation scores 301 for physical locations, based on electronically gleaned data 303 concerning the locations. This data 303 is retrieved from a wide variety of sources 305, such as news providers, blogs, microblogs (e.g., Twitter), government agencies, police reports, public records, location based check-in services (e.g., FourSquare), social networking sites, etc. Because the data 303 is gathered in real time and is continually being updated, the calculated reputation scores 301 stay current. Because the data 303 is electronically gleaned from many different sources 305, the reputation scores 301 are comprehensive. Additionally, the data 303 can be analyzed and weighted for reliability.

As used herein, the term "reputation score 301" means a single, quantified value measuring at least one category concerning a physical location, such as security. A reputation score 301 can quantify not only crime statistics, but security in a broader sense (e.g., likelihood of natural disaster, disease vectors, reliability of physical infrastructure, etc.). Furthermore, a reputation score 301 can be informed by additional, non-security related factors measuring how desirable the physical location is to visit. In other words, a reputation score 301 can quantify more than just security, but instead, as described in more detail below, can comprise a comprehensive rating taking into account many different aspects of a physical location beyond personal, physical security, such as, for example, business climate, demographics, economic indicators, and regional events. A reputation score 301 can be thought of as a categorical rating for a particular category, such as security, health, nightlife, or buzz, or a combination of categories.

As illustrated in FIG. 3, a plurality of data collecting modules 309 of the physical location rating management system 101 collect data 303 concerning various physical locations. Each data collecting module 309 collects data 303 from one or more data sources 305, which are typically located remotely from the physical location rating management system 101. Although only three data collecting modules 309 and three data sources 305 are illustrated, it is to be understood that typically many more are utilized in practice.

As noted above, the data collecting modules 309 can glean a wide variety of data 303 from many different types of data sources 305. Examples of types of data 303 that can be automatically collected from different sources 305 include identity theft or other financial fraud statistics from financial institutions, current or last known locations of stolen property from anti-theft devices such as PCLoJack, LoJack or OnStar, crime statistics and residences of registered sex offenders from police precincts, incident reports from fire stations, news articles from both traditional and new media publishers, blogs, microblogs, social network status updates, current weather originating from news or meteorological sources, disease infection patterns and alerts originating from hospitals and government agencies, combined reputation (and demographics) resulting from location check-in services such as Google Latitude, FourSquare or FaceBook Places, information resulting from wireless provider and/or law enforcement tracking systems (e.g., E911), median house prices, median incomes, zoning regulations, education statistics, public records, intelligence reports from government agencies, warnings and alerts from the U.S. State Department, physical locations of computing devices at the times of malware infection or attack originating from computer security providers, etc. It is to be understood that although these are examples of different types of data 303 that can be collected from different types of sources 305, the list is not intended to be complete or exclusive. In various embodiments, more, fewer and/or different types of data 303 can be collected from different sources 305 and/or types of sources 305 as desired.

As the data collecting modules 309 collect data 303 from sources 305, a location determining module 311 of the physical location rating management system 101 analyzes the collected data 303 to determine specific physical locations to which it pertains. In different embodiments and/or for different types of data 303, specific physical locations can be measured in different ways (e.g., a latitude and longitude with a surrounding radius or bounding polygon, municipal boundaries of a city, legal boundaries of a county, a national park or monument, a voting precinct, etc.). For example, when processing collected news articles and blog feeds, the location determining module 311 parses the text to identify the location described therein. In some cases, an overt point of reference for a location can be identified in the body, or even the title, of an article (e.g., "Eiffel Tower targeted by terrorists" or "Manhattan Beach, Calif. plans to move all overhead wires underground"). In other instances, the location determining module 311 can infer the location through content such as a reference to an entity associated with a given location, such as a politician associated with a given district, or a company associated with a given corporate headquarters or branch office. Much of the data 303 being collected overtly includes location specifics. For example, data 303 such as crime or health statistics, real estate prices, weather reports, zoning regulations and the like are inherently associated with specific locations. Other types of data 303 are analyzed to determine the associated location, as described above concerning news articles and blogs. Where the location determining module 311 cannot automatically associate collected data 303 with a specific location, that data 303 can be discarded, or moved to a queue for manual review and identification.

An adjustment determining module 313 of the physical location rating management system 101 determines score adjustment factors 315 for specific collected data 303. A score adjustment factor 315 quantifies whether specific collected data 303 concerning a specific location is to have a negative or positive impact on the corresponding reputation score 301 for the location, or be discarded as inconsequential. The specific functionality used by the adjustment determining module 313 varies depending upon the type of data 303 in question. For example, for news articles and blog feeds, an automated process such as keyword scoring could be used, in which occurrences of specific keywords in the data 303 are worth specific positive and negatives values. For example, "murder" could have a value of −100, "shooting" a value of −50, "wins" a value of +2, "awarded" a value of +10, "rehabilitation" a value of +15, etc. These are simply examples of keywords and associated values. Many other keywords and different specific associated values by which to adjust a score adjustment factor 315 can be used in various embodiments. In some embodiments, more complex automated processes are used, such as Bayesian or LSA document classification.

Additionally, the occurrence of specific events indicated by the gleaned data 303 can affect the score adjustment factor 315 for a given location by a given positive or negative value. For example, in response to indications of incidents of identity theft (from e.g., banks), computer security breaches (from, e.g., a provider of computer security services) or armed robbery (from, e.g., police reports), the adjustment determining module 313 can lower a score adjustment factor 315 by specific values. On the other hand, the adjustment determining module 313 can raise a score adjustment factor 315 in response to, e.g., the opening of new businesses, the winning of civic awards, or raising real estate prices. In some embodiments, some data 303 can be reviewed and scored by human analysts, in addition to automated data 303 review.

In addition to determining score adjustment factors 315 concerning specific collected data 303, the adjustment determining module 313 can determine for how long given score adjustment factors 315 are relevant. For example, the impact on a reputational score 301 from a sex offender living within a given location would remain in effect until the offender moves, while the occurrence of a single petty theft would likely only affect the reputational score 301 for a shorter period (e.g., 90 days). Thus, in some embodiments, the adjustment determining module 313 determines lengths of time which given score adjustment factors 315 are to affect corresponding reputational scores, based on the corresponding collected data 303.

In some embodiments, the adjustment determining module 313 also identifies indications in collected data 303 that a corresponding score adjustment factor 315 is to be applied temporally. For example, the daytime crime rates in an area might be very low while the nighttime crime rates are significantly higher. Similarly, the daytime location service (FourSquare) check-ins might consist of mostly business people, while the nighttime check-ins might be from less respectable characters. By identifying times of day (or days of the week, times of the year, etc.) when incidents occur, the adjustment determining module 313 can identify corresponding times during which specific score adjustment factors 315 are to affect or not affect reputation scores 301.

An aggregating module 307 of the physical location rating management system 101 aggregates the score adjustment factors 315 for each location in real time, as the adjustment determining module 313 determines them. Recall that as the data collecting modules 309 collect data 303 from various sources 305, the location determining module 311 determines locations to which the data 303 pertains, and the adjustment determining module 313 determines corresponding score adjustment factors 315. For each specific physical location identified by the location determining module 311, the aggregating module 307 aggregates the corresponding score adjustment factors 315 as they are determined. In some embodiments, the aggregating module 307 also aggregates any time limitations or temporal applicability concerning score adjustment factors 315 as determined by the adjustment determining module 313. In some embodiments, the aggregating module 307 also weighs score adjustment factors 315 based upon the source 305 from which the corresponding data 303 originates. For example, police reports would likely receive a higher weighting than blogs. It is to be understood that the specific weights to associate with specific data sources 305 is a variable design parameter.

The aggregating module 307 stores the aggregated score adjustment factors 315 for each location in a geospatial data storage mechanism 317, which can be in the form of a database or other storage mechanism that supports storing, indexing, searching for and retrieving data based on location. In some embodiments, the geospatial data storage mechanism 317 can be instantiated in the form of a Microsoft SQL Server or an Oracle database, both of which are capable of storing location information (as longitude and latitude with surrounding radius or bounding polygon) in rows along with other data, as well as searching based on this location information.

A reputation score calculating module 319 of the of the physical location rating management system 101 can calculate a current reputation score 301 for any physical location on which data 303 has been collected. To do so, the reputation score calculating module 319 retrieves the aggregated score adjustment factors 315 for the specific location from the geospatial data storage mechanism 317. Recall that each score adjustment factor 315 indicates a value by which to adjust a corresponding reputation score 301 up or down from a fixed starting value (e.g., zero). By applying all of the score adjustment factors 315 for a given location, the reputation score calculating module 319 calculates a current reputation score 301 for that location, based on all the relevant collected data 303 from the plurality of sources 305.

Note that in embodiments in which score adjustment factors 315 only apply for determined lengths of time, the aggregating module 307 keeps the stored score adjustment factors 315 in the geospatial data storage mechanism 317 current, such that any expired score adjustment factors 315 are not applied to the calculated reputation score 301. In other words, reputation scores 301 calculated for given locations are current, because they reflect the currently applicable score adjustment factors 315 stored in the geospatial data storage mechanism 317. The reputation score calculating module 319 can also filter aggregated score adjustment factors 315 when calculating a reputation score 301 for a given location based on determined temporal applicability, such as time of day, day of the week, time of the year, etc. Thus, for example, the current calculated reputation score 301 for, e.g., Times Square, would vary between, e.g., New Year's Eve and the rest of the year, or between a weekday at noon and Saturday night).

In some embodiments, the collected data 303 is logged, along with corresponding determined locations and score adjustment factors 315 that were derived therefrom, for example in the geospatial data storage mechanism 317. This logged data can be subsequently used as evidence for the calculation of given reputational scores 301, should this ever be desired at a later point in time.

Figure 4:
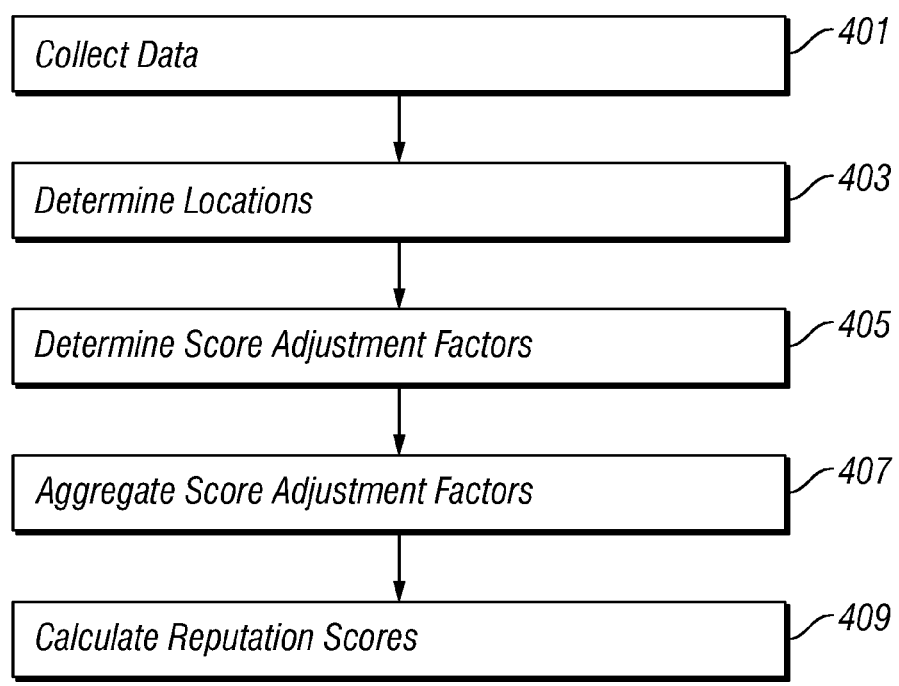
FIG. 4 is a flowchart of the operation of a physical location rating management system, according to some embodiments.

FIG. 4 illustrates steps of the operation of the physical location rating management system 101 (FIG. 1), according to some embodiments. The plurality of data collecting modules 309 (FIG. 3) collect 401 a plurality of types of data 303 (FIG. 3) concerning a plurality of physical locations from a plurality of sources 305 (FIG. 3). The location determining module 311 (FIG. 3) determines 403 specific physical locations to which specific collected data 303 (FIG. 3) pertains. The adjustment determining module 313 (FIG. 3) determines 405 score adjustment factors 315 (FIG. 3) quantifying adjustments to make to reputation scores 301 (FIG. 3) for multiple, specific physical locations, based on specific collected data 303 (FIG. 3). The aggregating module 307 (FIG. 3) aggregates 407 the determined score adjustment factors 315 (FIG. 3) for each of the multiple, specific physical locations, in real time, as the score adjustment factors 315 (FIG. 3) are determined. The reputation score calculating module 319 (FIG. 3) calculates 409 specific reputation scores 301 (FIG. 3) for specific physical locations, based on the aggregated score adjustment factors 315 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for automatically calculating reputation scores for physical locations, the method comprising the steps of:

collecting, by a computer, a plurality of types of data concerning a plurality of physical locations from a plurality of sources;

determining, by the computer, specific physical locations to which specific collected data pertains;

determining, by the computer, specific score adjustment factors quantifying adjustments to make to reputation scores for multiple, specific physical locations, based on specific collected data;

aggregating, by the computer, the determined score adjustment factors for each of the multiple, specific physical locations, in real time, as the score adjustment factors are determined;

calculating, by the computer, specific reputation scores for specific physical locations based on the aggregated score adjustment factors for the specific physical locations;

determining, by the computer, specific lengths of time for which at least some specific determined score adjustment factors are to affect calculation of reputation scores for specific physical locations;

aggregating, by the computer, the at least some determined score adjustment factors during the determined lengths of time; and calculating, by the computer, specific reputation scores for specific physical locations, based on the aggregated score adjustment factors during the determined lengths of time, for the specific physical locations;

wherein a specific reputation score comprises a single, quantified value measuring at least one category concerning a specific physical location, based on the collected data from the plurality of sources concerning the specific physical location.

2. The method of claim 1 wherein determining, by the computer, a specific physical location to which specific collected data pertains further comprises:

parsing, by the computer, text of the specific collected data; and identifying the specific physical location in the parsed text of the specific collected data.

3. The method of claim 1 wherein determining, by the computer, a specific physical location to which specific collected data pertains further comprises:

inferring, by the computer, the specific physical location from a reference in the specific collected data.

4. The method of claim 1 wherein determining, by the computer, specific score adjustment factors quantifying adjustments to make to reputation scores for multiple, specific physical locations further comprise:

performing, by the computer, keyword scoring of specific collected data.

5. The method of claim 1 wherein determining, by the computer, specific score adjustment factors quantifying adjustments to make to reputation scores for multiple, specific physical locations further comprise:

performing, by the computer, automated document classification of specific collected data.

6. The method of claim 1 further comprising:

weighing, by the computer, specific determined score adjustment factors for specific physical locations, based on originating sources of corresponding collected data.

7. The method of claim 1 further comprising:

storing, by the computer, the aggregated, determined score adjustment factors for each of the multiple, specific physical locations in a geospatial storage mechanism.

8. The method of claim 1 further comprising:

logging, by the computer, collected data corresponding to determined score adjustment factors and physical locations.

9. At least one non-transitory computer readable medium storing a computer program product for automatically calculating reputation scores for physical locations, the computer program product comprising:

program code for collecting a plurality of types of data concerning a plurality of physical locations from a plurality of sources;

program code for determining specific physical locations to which specific collected data pertains;

program code for determining specific score adjustment factors quantifying adjustments to make to reputation scores for multiple, specific physical locations, based on specific collected data;

program code for aggregating the determined score adjustment factors for each of the multiple, specific physical locations, in real time, as the score adjustment factors are determined;

program code for calculating specific reputation scores for specific physical locations, based on the aggregated score adjustment factors for the specific physical locations;

program code for determining specific lengths of time for which at least some specific determined score adjustment factors are to affect calculation of reputation scores for specific physical locations;

program code for aggregating the at least some determined score adjustment factors during the determined lengths of time; and program code for calculating specific reputation scores for specific physical locations, based on the aggregated score adjustment factors during the determined lengths of time, for the specific physical locations;

wherein a specific reputation score comprises a single, quantified value measuring at least one category concerning a specific physical location, based on the collected data from the plurality of sources concerning the specific physical location.

10. The computer program product of claim 9 wherein the program code for determining a specific physical location to which specific collected data pertains further comprises:

program code for parsing text of the specific collected data; and program code for identifying the specific physical location in the parsed text of the specific collected data.

11. The computer program product of claim 9 wherein the program code for determining a specific physical location to which specific collected data pertains further comprises:

program code for inferring the specific physical location from a reference in the specific collected data.

12. The computer program product of claim 9 wherein the program code for determining specific score adjustment factors quantifying adjustments to make to reputation scores for multiple, specific physical locations further comprises:

program code for performing keyword scoring of specific collected data.

13. The computer program product of claim 9 wherein the program code for determining specific score adjustment factors quantifying adjustments to make to reputation scores for multiple, specific physical locations further comprises:

program code for performing automated document classification of specific collected data.

14. The computer program product of claim 9 further comprising:

program code for weighing specific determined score adjustment factors for specific physical locations, based on originating sources of corresponding collected data.

15. The computer program product of claim 9 further comprising:

program code for storing the aggregated, determined score adjustment factors for each of the multiple, specific physical locations in a geospatial storage mechanism.

16. The computer program product of claim 9 further comprising:

program code for determining specific indications of temporal applicability for at least some specific determined score adjustment factors for specific physical locations;

program code for aggregating the specific indications of temporal applicability for the at least some determined score adjustment factors; and program code for calculating specific reputation scores for specific physical locations, based on the aggregated score adjustment factors filtered according to aggregated specific indications of temporal applicability.

17. A computer implemented method for automatically calculating reputation scores for physical locations, the method comprising the steps of:
- collecting, by a computer, a plurality of types of data concerning a plurality of physical locations from a plurality of sources;
- determining, by the computer, specific physical locations to which specific collected data pertains;
- determining, by the computer, specific score adjustment factors quantifying adjustments to make to reputation scores for multiple, specific physical locations, based on specific collected data;
- aggregating, by the computer, the determined score adjustment factors for each of the multiple, specific physical locations, in real time, as the score adjustment factors are determined;
- calculating, by the computer, specific reputation scores for specific physical locations based on the aggregated score adjustment factors for the specific physical locations;
- determining, by the computer, specific indications of temporal applicability for at least some specific determined score adjustment factors for specific physical locations;
- aggregating, by the computer, the specific indications of temporal applicability for the at least some determined score adjustment factors; and
- calculating, by the computer, specific reputation scores for specific physical locations, based on the aggregated score adjustment factors filtered according to aggregated specific indications of temporal applicability;
- wherein a specific reputation score comprises a single, quantified value measuring at least one category concerning a specific physical location, based on the collected data from the plurality of sources concerning the specific physical location.

18. The method of claim 17 wherein determining, by the computer, a specific physical location to which specific collected data pertains further comprises:
- parsing, by the computer, text of the specific collected data; and
- identifying the specific physical location in the parsed text of the specific collected data.

19. The method of claim 17 wherein determining, by the computer, specific score adjustment factors quantifying adjustments to make to reputation scores for multiple, specific physical locations further comprise:
- performing, by the computer, automated document classification of specific collected data.

20. The method of claim 17 further comprising:
- weighing, by the computer, specific determined score adjustment factors for specific physical locations, based on originating sources of corresponding collected data.

* * * * *